(12) United States Patent
Yamamoto et al.

(10) Patent No.: US 10,128,533 B2
(45) Date of Patent: Nov. 13, 2018

(54) SOLID ELECTROLYTE MATERIAL AND LITHIUM BATTERY

(71) Applicants: DENSO CORPORATION, Kariya, Aichi-pref. (JP); The Gakushuin School Corporation, Tokyo (JP)

(72) Inventors: Nobuo Yamamoto, Kariya (JP); Yoshinori Satou, Kariya (JP); Shigeki Komine, Kariya (JP); Daisuke Mori, Tokyo (JP); Yoshiyuki Inaguma, Nishitokyo (JP)

(73) Assignees: DENSO CORPORATION, Kariya, Aichi-pref. (JP); The Gakushuin School Corporation, Tokyo (JP)

( * ) Notice: Subject to any disclaimer, the term of this patent is extended or adjusted under 35 U.S.C. 154(b) by 126 days.

(21) Appl. No.: 15/082,186

(22) Filed: Mar. 28, 2016

(65) Prior Publication Data

US 2016/0294003 A1 Oct. 6, 2016

(30) Foreign Application Priority Data

Mar. 31, 2015 (JP) .................................. 2015-71670

(51) Int. Cl.
- *H01M 10/0562* (2010.01)
- *H01M 10/0525* (2010.01)
- *C01G 17/00* (2006.01)
- *H01B 1/08* (2006.01)

(52) U.S. Cl.
CPC ........ *H01M 10/0562* (2013.01); *C01G 17/00* (2013.01); *C01G 17/006* (2013.01); *H01B 1/08* (2013.01); *H01M 10/0525* (2013.01); *C01P 2002/54* (2013.01); *C01P 2002/76* (2013.01); *C01P 2002/82* (2013.01); *C01P 2004/04* (2013.01); *C01P 2006/40* (2013.01)

(58) Field of Classification Search
CPC ...................... H01M 10/0525; H01M 10/0562
See application file for complete search history.

(56) References Cited

U.S. PATENT DOCUMENTS

| | | | |
|---|---|---|---|
| 2007/0042272 A1 | 2/2007 | Ugaji et al. | |
| 2011/0104526 A1* | 5/2011 | Boxley | H01M 2/1646 429/50 |

FOREIGN PATENT DOCUMENTS

| | | | | |
|---|---|---|---|---|
| JP | 2005-038844 | | 2/2005 | |
| JP | 2011-129407 A | | 6/2011 | |
| JP | 2015-002054 | * | 1/2015 | .............. H01M 4/62 |

OTHER PUBLICATIONS

Ruijuan Xiao et al., Candidate structures for inorganic lithium solid-state electrolytes identified by high-throughput bond-valence calculations, Journal of Materiomics, vol. 1, Issue 4, Aug. 22, 2015, pp. 325-332 (Year: 2015).*

(Continued)

*Primary Examiner* — Osei K Amponsah
(74) *Attorney, Agent, or Firm* — Harness, Dickey & Pierce, P.L.C.

(57) ABSTRACT

A solid electrolyte material includes: $Li_{2+y}Ge_{1-x}M_xO_3$. x satisfies an equation of $0 \leq x < 0.5$. y satisfies an equation of $-0.5 < y < 0.5$. M represents at least one element selected from Mg, Al, Ti, V, Cr, Mn, Fe, Co, Ni, Zn, Ga, Zr, Sn, Nb, Sb, Cu, Sc, Ta, and Hf. Ge has a six-coordinate structure, or the solid electrolyte material has a crystal structure attributed to monoclinic, C12/c1.

6 Claims, 4 Drawing Sheets

(56) References Cited

OTHER PUBLICATIONS

Ohtaka, O., "Pressure Induced Coordination Number Change in Amorphous and Liquid $GeO_2$: XAFS Measurement under Pressure." The Japanese Society for Synchrotron Radiation Research, 2003, pp. 27-34.

Sun, Y. et al., "Oxygen substitution effects in $Li_{10}GeP_2S_{12}$ solid electrolyte." Journal of Power Sources, vol. 323, 2016, pp. 798-803.

Völlenkle, H., "Verfeinerung der Kristallstrukturen von $Li_2SiO_3$ und $Li_2GeO_3$." Zeitschrift für Kristallographie, vol. 154, 1981, pp. 77-81.

* cited by examiner

ANALYSIS POINT 1

SOLID ELECTROLYTE MATERIAL AND LITHIUM BATTERY

CROSS REFERENCE TO RELATED APPLICATION

This application is based on Japanese Patent Application No. 2015-71670 filed on Mar. 31, 2015, the disclosure of which is incorporated herein by reference.

TECHNICAL FIELD

The present disclosure relates to a solid electrolyte material and a lithium battery.

BACKGROUND

With the spread of laptop computers, mobile phones, digital cameras, and the like, the demand for secondary batteries for driving these small-sized electronic devices has been expanding. Further, for these electronic devices, lithium batteries have been increasingly used for their capability to achieve high capacity.

In addition to the use for these small-sized electronic devices, the application of lithium batteries for vehicles (EV, HV, PHV), household power supplies (HEMS), and the like, where a large amount of electric power is required, has also been considered.

In a lithium battery (e.g., lithium ion secondary battery), generally, a positive electrode plate and a negative electrode plate are laminated with a separator therebetween to form an electrode assembly, and the electrode assembly is housed in a case together with a nonaqueous electrolyte (electrolytic solution).

In a conventional lithium battery, an electrolytic solution containing a flammable organic solvent is used. Therefore, it is necessary to install a safety device to suppress the exothermic reaction in case of short-circuiting or improve the structure or materials to prevent a short circuit.

In order to deal with this problem, it has been considered replacing the electrolytic solution with a solid electrolyte layer to make an all-solid-state battery. Because a flammable organic solvent is not used in the battery, such an all-solid-state lithium battery allows for the simplification of a safety device and is excellent in terms of production cost and productivity.

A solid electrolyte layer for an all-solid-state lithium battery can be formed from the solid electrolyte material described in PTL 1 or 2.

PTL 1 describes a solid electrolyte represented by $Li_xMO_yN_z$ (wherein M is at least one element selected from the group consisting of Si, B, Ge, Al, C, Ga, and S, and x, y, and z satisfy x=0.6 to 5.0, y=1.050 to 3.985, and z=0.01 to 0.50, respectively).

PTL 2 describes a technique in which $GeS_2$ or $Sb_2S_3$, which is stable in air, is added to a $Li_2S$—$P_2S_5$-based sulfide solid electrolyte material containing unreacted $Li_2S$, thereby eliminating unreacted $Li_2S$.

However, the solid electrolyte material described in PTL 1 has a problem in that in an N-rich system, a decrease in ion conductivity cannot be prevented.

The solid electrolyte material described in PTL 2 can exert effectiveness in reducing the amount of hydrogen sulfide generated, but the generation of hydrogen sulfide cannot yet be completely prevented. In addition, hydrogen sulfide may be generated not only from the reaction with moisture but also in the case of battery abnormalities.

PTL 1: JP-2005-38844 A (corresponding to US 2007/0042272 A1)
PTL 2: JP-2011-129407 A

SUMMARY

It is an object of the present disclosure to provide a solid electrolyte material usable as a solid electrolyte, as well as a battery using the same.

According to a first aspect of the present disclosure, a solid electrolyte material includes: $Li_{2+y}Ge_{1-x}M_xO_3$. x satisfies an equation of $0 \leq x < 0.5$. y satisfies an equation of $-0.5 < y < 0.5$. M represents at least one element selected from Mg, Al, Ti, V, Cr, Mn, Fe, Co, Ni, Zn, Ga, Zr, Sn, Nb, Sb, Cu, Sc, Ta, and Hf. Ge has a six-coordinate structure.

In the above solid electrolyte material, a $Li_2GeO_3$-based oxide represented by $Li_{2+y}Ge_{1-x}M_xO_3$ has a specific crystal structure, whereby Li-ion conductivity is exerted. In addition, the $Li_2GeO_3$-based oxide forming the solid electrolyte material of the disclosure does not contain conventional N or S. Accordingly, the ion conductivity does not decrease, and hydrogen sulfide gas is not generated either. That is, when the solid electrolyte material of the disclosure is used as a solid electrolyte in a battery, the battery can be used safely for a long period of time.

According to a second aspect of the present disclosure, a lithium battery includes: a solid electrolyte including the solid electrolyte material according to the first aspect.

The above lithium battery uses the above solid electrolyte material of the disclosure for a solid electrolyte, and exerts the above effect.

According to a third aspect of the present disclosure, a solid electrolyte material includes: $Li_{2+y}Ge_{1-x}M_xO_3$. x satisfies an equation of $0 \leq x < 0.5$. y satisfies an equation of $-0.5 < y < 0.5$. M represents at least one element selected from Mg, Al, Ti, V, Cr, Mn, Fe, Co, Ni, Zn, Ga, Zr, Sn, Nb, Sb, Cu, Sc, Ta, and Hf. The solid electrolyte material has a crystal structure attributed to monoclinic, C12/c1.

In the above solid electrolyte material, a $Li_2GeO_3$-based oxide represented by $Li_{2+y}Ge_{1-x}M_xO_3$ has a specific crystal structure, whereby Li-ion conductivity is exerted. In addition, the $Li_2GeO_3$-based oxide forming the solid electrolyte material of the disclosure does not contain conventional N or S. Accordingly, the ion conductivity does not decrease, and hydrogen sulfide gas is not generated either. That is, when the solid electrolyte material of the disclosure is used as a solid electrolyte in a battery, the battery can be used safely for a long period of time.

According to a fourth aspect of the present disclosure, a lithium battery includes: a solid electrolyte including the solid electrolyte material according to the third aspect.

The above lithium battery uses the above solid electrolyte material of the disclosure for a solid electrolyte, and exerts the above effect.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

In order to solve the difficulties mentioned above, the present inventors have conducted extensive studies about solid electrolyte materials made of an electrically conductive oxide free of N and S. As a result, they have accomplished the disclosure.

[Solid Electrolyte Material]

(First Solid Electrolyte Material)

A solid electrolyte material of the present mode is represented by $Li_{2+y}Ge_{1-x}M_xO_3$ ($0 \leq x < 0.5$, $-0.5 < y < 0.5$, M: at least one element selected from Mg, Al, Ti, V, Cr, Mn, Fe, Co, Ni, Zn, Ga, Zr, Sn, Nb, Sb, Cu, Sc, Ta, and Hf). Further, Ge has a six-coordinate structure. Because the solid electrolyte material of the disclosure has this configuration, the solid electrolyte material has excellent Li ion conductivity.

In the compositional formula showing the configuration of the solid electrolyte material, M is at least one element selected from Mg, Al, Ti, V, Cr, Mn, Fe, Co, Ni, Zn, Ga, Zr, Sn, Nb, Sb, Cu, Sc, Ta, and Hf. Presumably, because M is selected from these elements, vacancies are present in the crystal structure, whereby the inhibition of Li-ion conduction is suppressed, resulting in improved Li-ion conductivity.

In the compositional formula showing the configuration of the solid electrolyte material, x is smaller than 0.5. That is, M does not exceed Ge.

Figure 1:
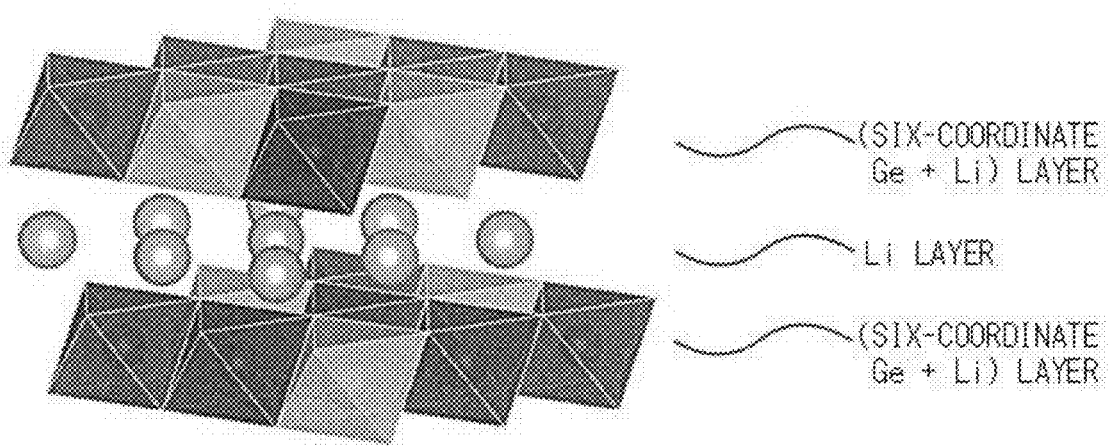
FIG. 1 shows the crystal structure of a solid electrolyte material of an embodiment.

Further, because Ge has a six-coordinate structure, the solid electrolyte material has the crystal structure shown in FIG. 1. As shown in FIG. 1, the solid electrolyte material has a layered structure including a layer of six-coordinate Ge+Li and a Li layer. Further, in the solid electrolyte material, Li ions migrate within the Li layer along the direction in which the Li layer extends. That is, conductivity for Li ions is obtained. As a result, the solid electrolyte material functions as a solid electrolyte.

Here, the method for confirming that Ge has a six-coordinate structure is not limited. As mentioned below, it can be confirmed using the extended X-ray absorption fine structure (EXAFS).

(Second Solid Electrolyte Material)

A solid electrolyte material of the present mode is represented by $Li_{2+y}Ge_{1-x}M_xO_3$ ($0 \leq x < 0.5$, $-0.5 < y < 0.5$, M: at least one element selected from Mg, Al, Ti, V, Cr, Mn, Fe, Co, Ni, Zn, Ga, Zr, Sn, Nb, Sb, Cu, Sc, Ta, and Hf). Further, the solid electrolyte material has a crystal structure attributed to monoclinic, C12/c1.

In the solid electrolyte material of the disclosure, $Li_{2+y}Ge_{1-x}M_xO_3$ ($0 \leq x < 0.5$, $-0.5 < y < 0.5$, M: at least one element selected from Mg, Al, Ti, V, Cr, Mn, Fe, Co, Ni, Zn, Ga, Zr, Sn, Nb, Sb, Cu, Sc, Ta, and Hf) is the same as in the case of the above first solid electrolyte material.

Further, because of the crystal structure attributed to monoclinic, C12/c1, the solid electrolyte material has the crystal structure shown in FIG. 1. As mentioned above, a solid electrolyte material of this structure functions as a solid electrolyte.

Here, the method for confirming that the solid electrolyte material has the above crystal structure is not limited. As mentioned below, it can be confirmed using TEM analysis.

(Solid Electrolyte Material)

It is preferable that the solid electrolyte material of each mode mentioned above has high Li-ion conductivity. For example, it is preferable that the Li-ion conductivity at room temperature is $10^{-5}$ S/cm or more, more preferably $10^{-4}$ S/cm or more.

The solid electrolyte material of each mode can be used as a solid electrolyte in a battery. In a lithium battery including a positive electrode containing a positive electrode active material, a negative electrode containing a negative electrode active material, and an electrolyte placed between the positive electrode and the negative electrode, the solid electrolyte can be contained in at least one of the positive electrode, the negative electrode, and the electrolyte. In the case where the solid electrolyte material of each mode is contained in the electrolyte, the electrolyte may be a solid electrolyte or an electrolytic solution having the solid electrolyte material dispersed therein.

(Production Method)

As long as the first and the second solid electrolyte materials are configured as above, production methods therefor are not limited.

For example, the production may be as follows: a Li compound to serve as a Li source (Li carbonate) and a Ge compound to serve as a Ge source (Ge oxide) are heat-treated (calcined, sintered) to form a sintered body (Li—Ge composite oxide), and the sintered body is maintained at high temperature and high pressure to change the crystal structure.

[Lithium Battery]

A lithium battery of the present mode uses a solid electrolyte including the solid electrolyte material. That is, the solid electrolyte material of each mode mentioned above is used for a solid electrolyte.

Incidentally, a lithium battery is a battery in which Li ions serve to conduct electricity, and lithium ion batteries are included. In addition, the lithium battery of the present mode may be a primary battery or a secondary battery, but is preferably a secondary battery.

The configuration of the lithium battery of the present mode may be the same as that of a conventional lithium battery except for using the solid electrolyte material of each mode mentioned above for a solid electrolyte. It is preferable that the lithium battery of the present mode is an all-solid-state lithium battery in which the electrolyte is composed only of a solid electrolyte.

Figure 2:
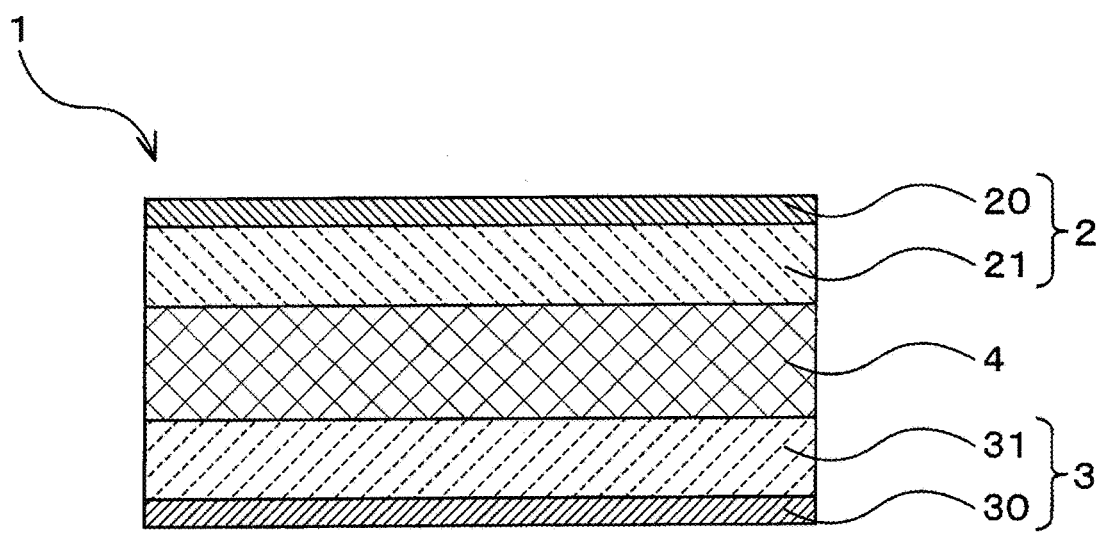
FIG. 2 is a cross-sectional view showing the configuration of a lithium battery of an embodiment.

An all-solid-state lithium battery 1 is configured to include, for example, as shown by the cross-sectional view of FIG. 2, a positive electrode 2 containing a positive electrode active material, a negative electrode 3 containing a negative electrode active material, and a solid electrolyte 4 formed between the positive electrode 2 and the negative electrode 3.

(Solid Electrolyte 4)

The solid electrolyte 4 is formed (placed) in the form of a layer between a positive electrode and a negative electrode. The solid electrolyte 4 includes the solid electrolyte material of each mode (the above solid electrolyte material). The content of the above solid electrolyte material in the solid electrolyte 4 is preferably within a range of 10 vol % to 100 vol %, for example, particularly within a range of 50 vol % to 100 vol %. In this case, components other than the above solid electrolyte material may be substances conventionally used for a solid electrolyte (solid electrolyte material, electrically conductive material, etc.).

In the lithium battery 1, it is preferable that the solid electrolyte 4 is composed only of the above solid electrolyte material (100 vol %).

The thickness of the solid electrolyte 4 is not limited, and is preferably within a range of 0.1 μm to 1000 μm, for example, particularly within a range of 0.1 μm to 300 μm.

The solid electrolyte 4 can be produced by pressing the solid electrolyte material, for example.

(Positive Electrode 2)

The positive electrode 2 contains a positive electrode active material. The positive electrode 2 has a positive electrode active material layer 21 on the surface of a positive current collector 20. The positive electrode active material layer 21 is a layer containing at least a positive electrode active material, and is formed by applying a positive electrode mixture mixed with at least one of a solid electrolyte, an electrically conductive material, and a binding material to the surface of the positive current collector 20.

As the positive electrode active material in the positive electrode 2, a known positive electrode active material may be used. Examples of usable positive electrode active materials include various oxides, sulfides, lithium-containing oxides, and electrically conductive polymers. It is preferable that the positive electrode active material is a lithium-transition metal composite oxide. Examples thereof include $LiCoO_2$, $LiNiO_2$, $LiNi_{1/3}Co_{1/3}Mn_{1/3}O_2$, $LiMn_2O_4$, $LiNi_{0.5}Mn_{1.5}O_4$, $LiFePO_4$, $LiMnPO_4$, and $LiCoO_4$.

The electrically conductive material in the positive electrode 2 ensures the electrical conductivity of the positive electrode 2. Examples of usable electrically conductive materials include, but are not limited to, fine particles of graphite and fine particles of amorphous carbon such as carbon black (e.g., acetylene black, ketjen black, carbon nanofibers, etc.) and needle coke.

The binding material in the positive electrode 2 binds the positive electrode active material particles and the electrically conductive material. Examples of usable binding materials include, but are not limited to, polytetrafluoroethylene (PTFE), polyvinylidene fluoride (PVDF), fluororesin copolymer, ethylene propylene diene rubber (EPDM), styrene butadiene rubber (SBR), nitrile rubber (NBR), fluororubber, carboxymethylcellulose (CMC), and polyacrylate.

As the positive current collector 20, it is possible to use a processed product of aluminum, stainless steel, or a like metal, such as a plate-shaped foil, screen, punched metal, or formed metal, without being limited thereto.

(Negative Electrode 3)

The negative electrode 3 contains a negative electrode active material. The negative electrode 3 has a negative electrode active material layer 31 on the surface of a negative electrode collector 30. The negative electrode active material layer 31 is a layer containing at least a negative electrode active material, and is formed by applying a negative electrode mixture mixed with at least one of a solid electrolyte, an electrically conductive material, and a binding material to the surface of the negative current collector 30.

As the negative electrode active material in the negative electrode 3, a conventional negative electrode active material may be used. Examples thereof include negative electrode active materials containing at least one element selected from Li metal, Sn, Si, Sb, Ge, Al, and C. Of these negative electrode active materials, it is preferable that C is a carbon material capable of storing/releasing electrolytic ions of the lithium ion secondary battery (having Li-storage capacity), examples thereof including natural graphite, artificial graphite, hard carbon, and soft carbon.

In addition, of these negative electrode active materials, Sn, Si, Sb, Ge, and Al are alloy materials particularly prone to volume changes. These negative electrode active materials may form alloys with other metals, such as Ti—Si, Ag—Sn, Sn—Sb, Ag—Ge, Cu—Sn, and Ni—Sn.

As the electrically conductive material in the negative electrode 3, a carbon material, a metal powder, an electrically conductive polymer, or the like may be used. In terms of electrical conductivity and stability, it is preferable to use a carbon material such as acetylene black, ketjen black, or carbon black.

Examples of binding materials for the negative electrode 3 include polytetrafluoroethylene (PTFE), polyvinylidene fluoride (PVDF), fluororesin copolymer, styrene butadiene rubber (SBR), acrylic rubber, fluororubber, polyvinyl alcohol (PVA), styrene-maleic acid resin, polyacrylate, and carboxymethylcellulose (CMC).

As the negative electrode collector 30, a conventional current collector may be used. It is possible to use a processed product of copper, stainless steel, titanium, nickel, or a like metal, such as a plate-shaped foil, screen, punched metal, or formed metal, without being limited thereto.

EXAMPLES

Hereinafter, the disclosure will be described using examples.

As an example of the disclosure, a solid electrolyte material was produced.

Example

Lithium carbonate ($Li_2CO_3$, manufactured by Kojundo Chemical Laboratory Co., Ltd.) and germanium oxide ($GeO_2$, manufactured by Rare Metallic Co., Ltd.) were used as starting materials. $Li_2CO_3$ and $GeO_2$ were weighed in an atomic ratio of 1.05:1, and heated and fired in an ambient-pressure atmosphere at 900° C. for 10 hours.

The obtained sintered body was ground, enclosed in an Au capsule, and maintained at 7.5 GPa and 1000° C. for 30 minutes.

As a result, a solid electrolyte material of the example ($Li_2GeO_3$) was produced.

(Evaluation)

The crystal structure of the produced solid electrolyte material was confirmed, and also the electrical conductivity was evaluated.

(Confirmation of Coordinate Structure)

Figure 3:
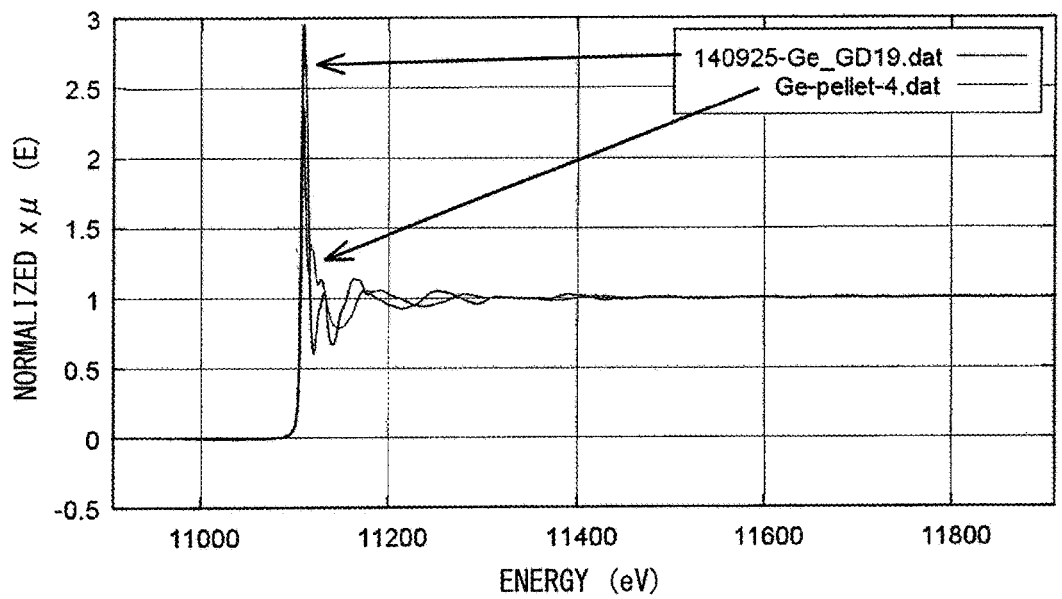
FIG. 3 shows the EXAFS spectrum of a solid electrolyte material of an example.

The extended X-ray absorption fine structure (EXAFS) spectrum of the K-absorption edge of Ge was determined from $k^3$-weighted data using an analysis software (Athena). Then, the obtained spectrum was Fourier-transformed into a radial distribution function. The EXAFS spectrum is shown in FIG. 3, while the radial distribution function is shown in FIG. 4.

Figure 4:
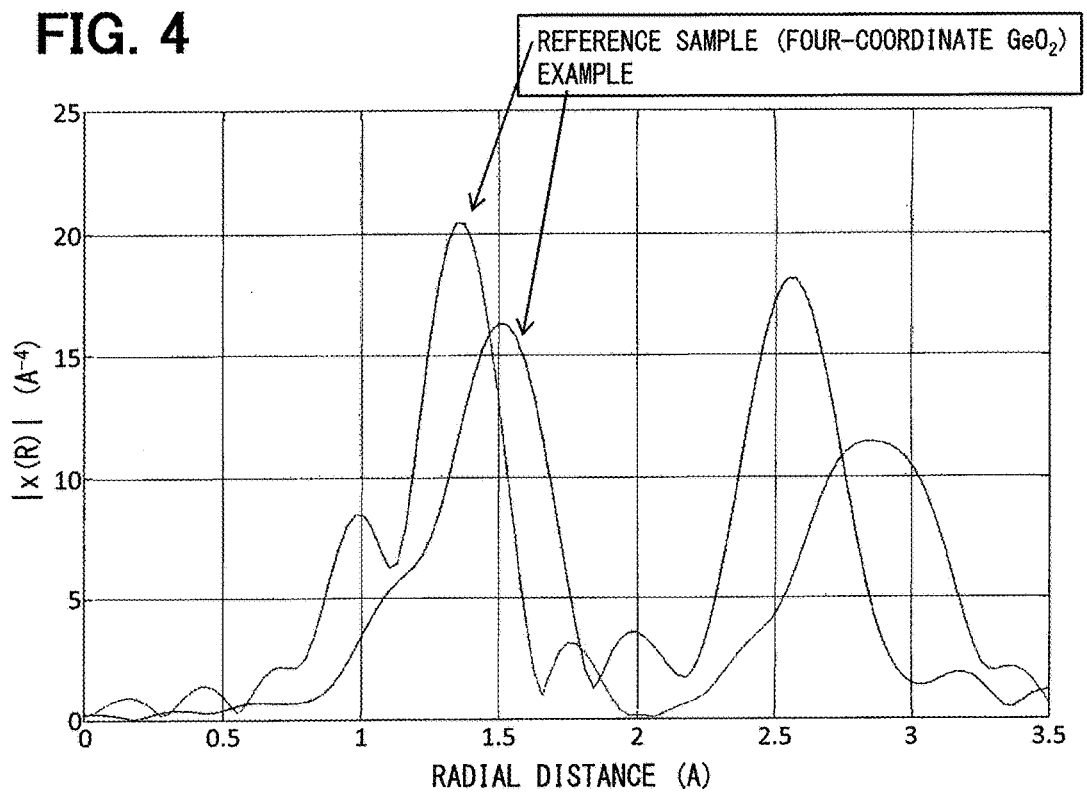
FIG. 4 is a graph showing the radial distribution function of a solid electrolyte material of an example.

Incidentally, in FIG. 4, $GeO_2$ having a four-coordinate structure is also shown as a reference sample.

In the graph of FIG. 4, peaks of the solid electrolyte material of the example ($Li_2GeO_3$) and the reference sample (four-coordinate $GeO_2$) can be seen at 1.5 Å and 1.3 Å, respectively. These peaks are derived from binding to O, which is the nearest neighbor atom of Ge. That is, the peaks are derived from the Ge—O bond resulting from the coordination of O to Ge.

Here, it is known that the ionic radius of six-coordinate Ge is greater than the ionic radius of four-coordinate Ge. For example, the ionic radius table obtained by Shannon et al., shows a diagram for Ge, in which Ge four-coordinate: 0.390 Å, Ge six-coordinate: 0.530 Å.

According to this information, the result of the measurement of radial distribution function shown in FIG. 4 indicates that Ge in the solid electrolyte material of the example has a six-coordinate structure.

(Confirmation of Crystal Structure)

Figure 5:
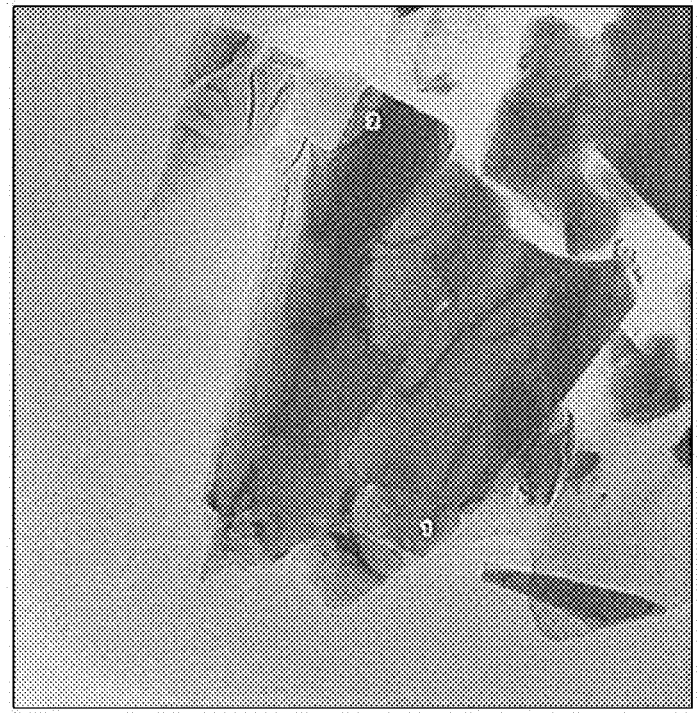
FIG. 5 shows a TEM image of a solid electrolyte material of an example.

First, a solid electrolyte material ($Li_2GeO_3$) was embedded in an epoxy resin and subjected to Ar ion milling to give a cross-sectional TEM sample (FIG. 5).

Figure 6:
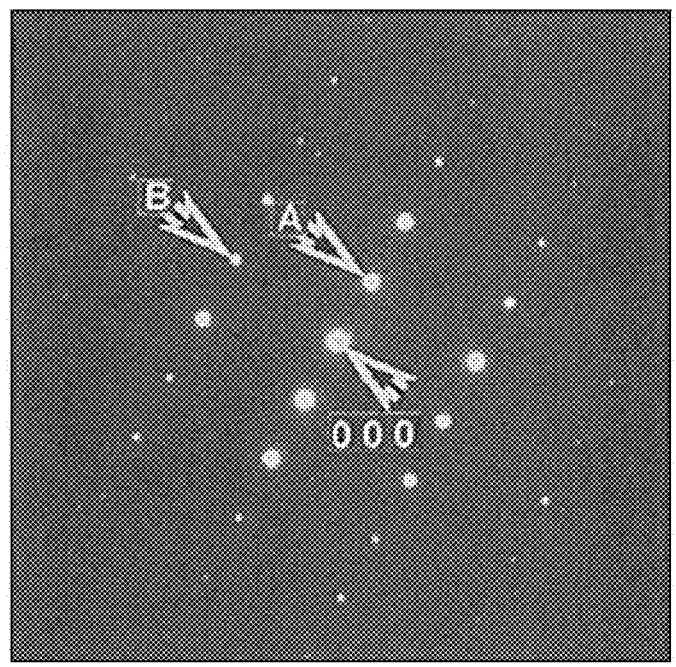
FIG. 6 shows the selected area diffraction pattern of a TEM sample of a solid electrolyte material of an example.

Next, the produced sample was photographed under TEM to give a selected area diffraction pattern (FIG. 6). Incidentally, the selected area diffraction pattern (FIG. 6) is a diffraction pattern at the analysis point 1 indicated with 1 in FIG. 5.

The obtained diffraction pattern was indexed. As a result, it was confirmed that the sample had a crystal structure attributed to monoclinic, C12/c1. Incidentally, in FIG. 6, measurements of the interplanar spacing were as follows: $d_A$=0.49 nm, $d_B$=0.25 nm.

(Electrical Conductivity)

A sample was cut from the produced solid electrolyte material to a thick of 0.5 mm, subjected to Au sputtering, and measured for electrical conductivity using an LCR meter.

As a result, the electrical conductivity was $1\times10^{-6}$ (S/cm) at 610 (K). That is, it was confirmed that the solid electrolyte material of the example had sufficient Li-ion conductivity as a solid electrolyte.

The solid electrolyte material of the example has sufficient Li-ion conductivity as a solid electrolyte. Accordingly, a lithium ion secondary battery using the same as an electrolyte (solid electrolyte) (e.g., the above configuration) can be obtained.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A solid electrolyte material comprising:
$Li_{2+y}Ge_{1-x}M_xO_3$, wherein:
x satisfies an equation of $0 \le x < 0.5$;
y satisfies an equation of $-0.5 < y < 0.5$;
M represents at least one element selected from Mg, Al, Ti, V, Cr, Mn, Fe, Co, Ni, Zn, Ga, Zr, Sn, Nb, Sb, Cu, Sc, Ta, and Hf; and
Ge has a six-coordinate structure.

2. A lithium battery comprising:
a solid electrolyte including the solid electrolyte material according to claim 1.

3. A solid electrolyte material comprising:
$Li_{2+y}Ge_{1-x}M_xO_3$, wherein:
x satisfies an equation of $0 \le x < 0.5$;
y satisfies an equation of $-0.5 < y < 0.5$;
M represents at least one element selected from Mg, Al, Ti, V, Cr, Mn, Fe, Co, Ni, Zn, Ga, Zr, Sn, Nb, Sb, Cu, Sc, Ta, and Hf; and
the solid electrolyte material has a crystal structure attributed to monoclinic, C12/c1.

4. A lithium battery comprising:
a solid electrolyte including the solid electrolyte material according to claim 3.

5. The solid electrolyte material according to claim 1, wherein the solid electrolyte material does not comprise sulfur (S).

6. The solid electrolyte material according to claim 3, wherein the solid electrolyte material does not comprise sulfur (S).

* * * * *